(12) United States Patent
Andrews et al.

(10) Patent No.: US 7,685,382 B2
(45) Date of Patent: Mar. 23, 2010

(54) DYNAMIC MEDIA FORMAT CONVERSION OF PHYSICAL VOLUMES

(75) Inventors: Benjamin L. Andrews, Tucson, AZ (US); Cheryl M. Friauf, Tucson, AZ (US); Gregory T. Kishi, Oro Valley, AZ (US); Mark A. Norman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 11/613,777

(22) Filed: Dec. 20, 2006

(65) Prior Publication Data

US 2008/0154984 A1 Jun. 26, 2008

(51) Int. Cl.
*G06F 12/00* (2006.01)
(52) U.S. Cl. .................................................... 711/161
(58) Field of Classification Search .................. 711/161
See application file for complete search history.

(56) References Cited

U.S. PATENT DOCUMENTS

2002/0004845 A1* 1/2002 Yamamoto et al. .......... 709/240

* cited by examiner

*Primary Examiner*—Pierre-Michel Bataille
*Assistant Examiner*—Hamdy S Ahmed
(74) *Attorney, Agent, or Firm*—Rabindranath Dutta; Konrad Raynes & Victor LLP

(57) ABSTRACT

A media server (e.g., a virtual tape server) implements a method for a dynamic media format conversion of physical volumes stored within a media library (e.g., a tape library). The method involves a recall of volume data in a media format f as stored in one or more source physical volumes of a source media, and an automatic premigration of the recalled volume data in a media format f to one or more target physical volumes of a target media. The media format f is different in one or more aspects from the media format f.

18 Claims, 9 Drawing Sheets

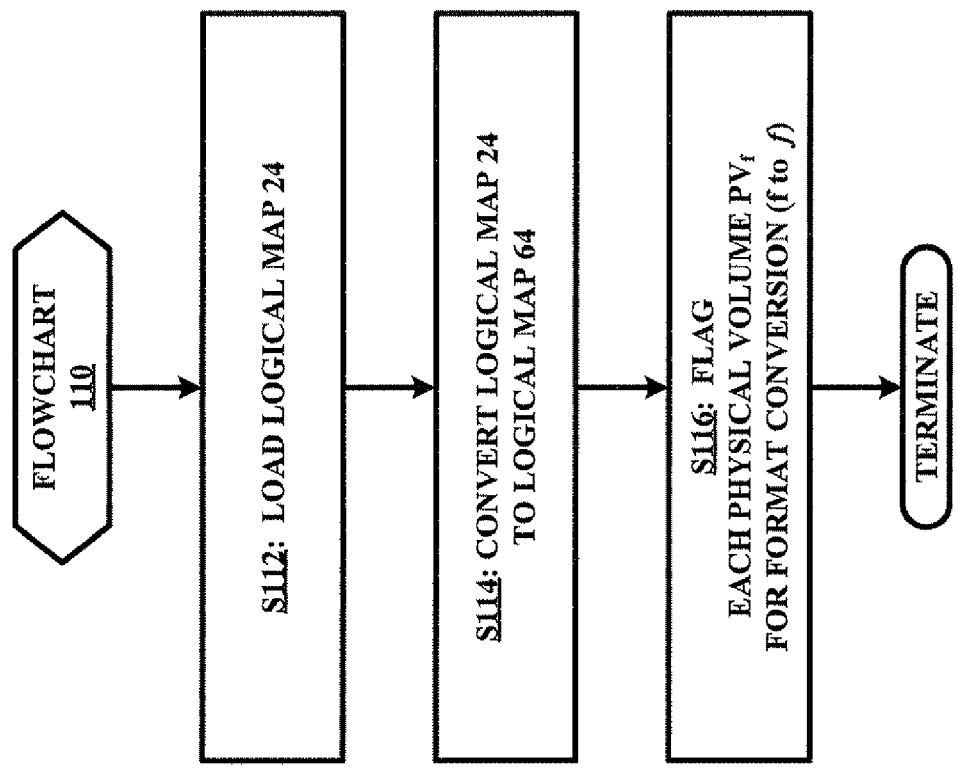
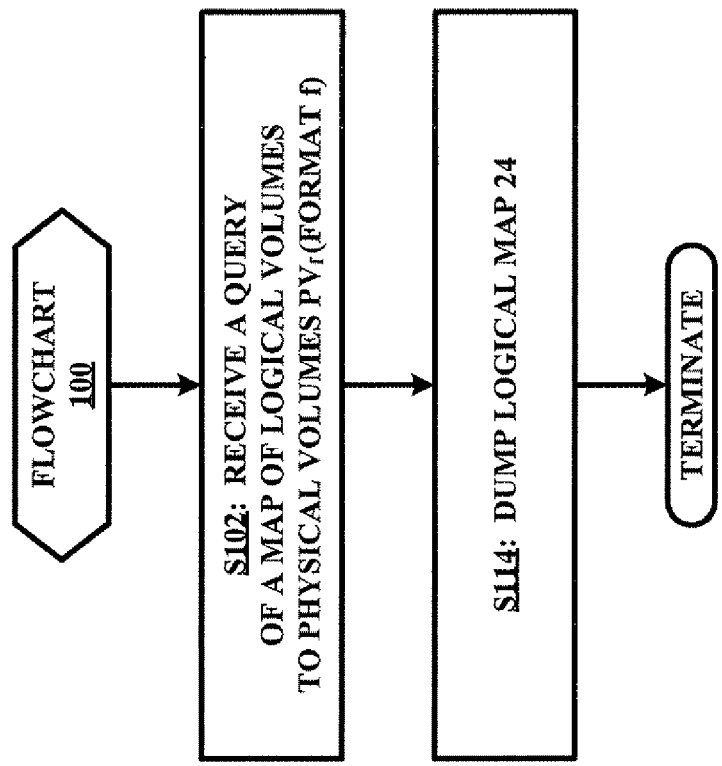
FIG. 3

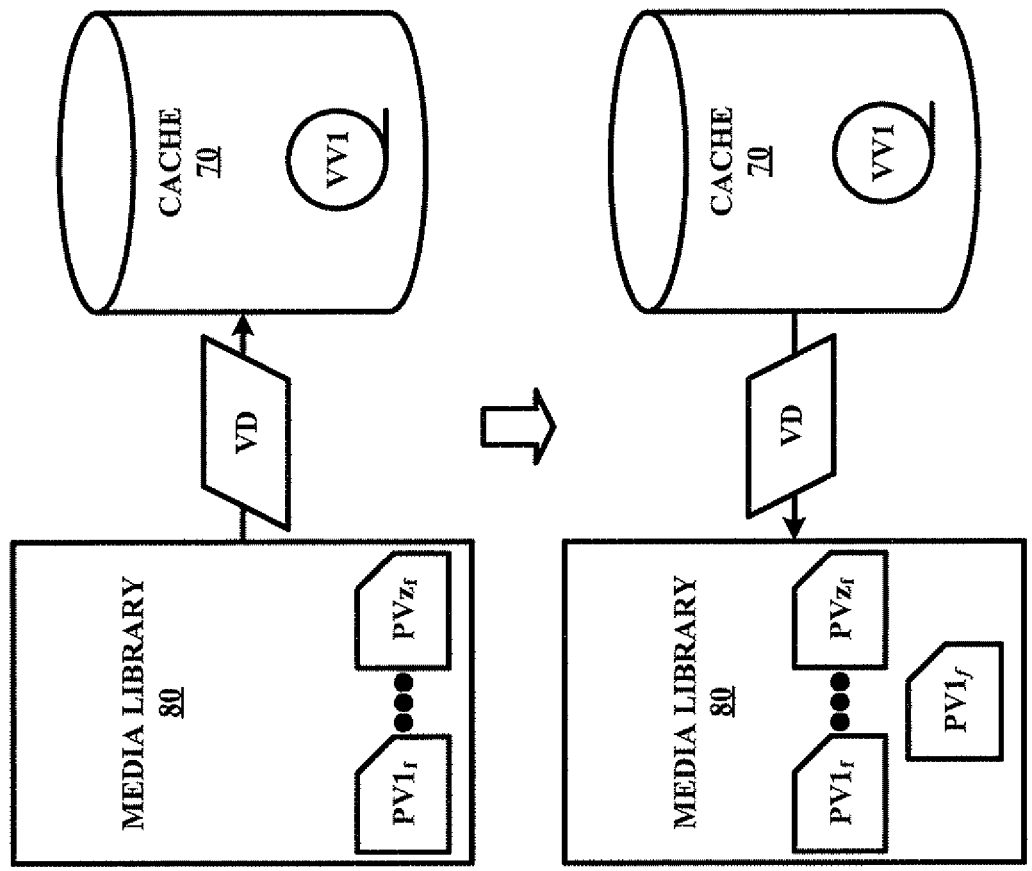
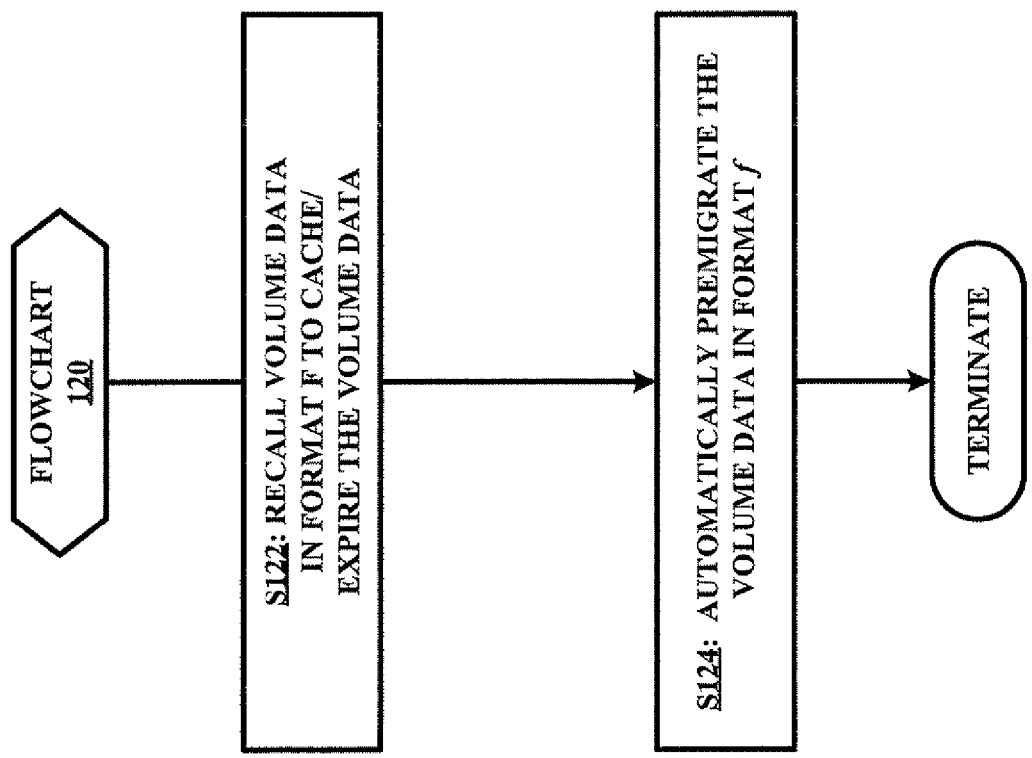
FIG. 6
FIG. 5

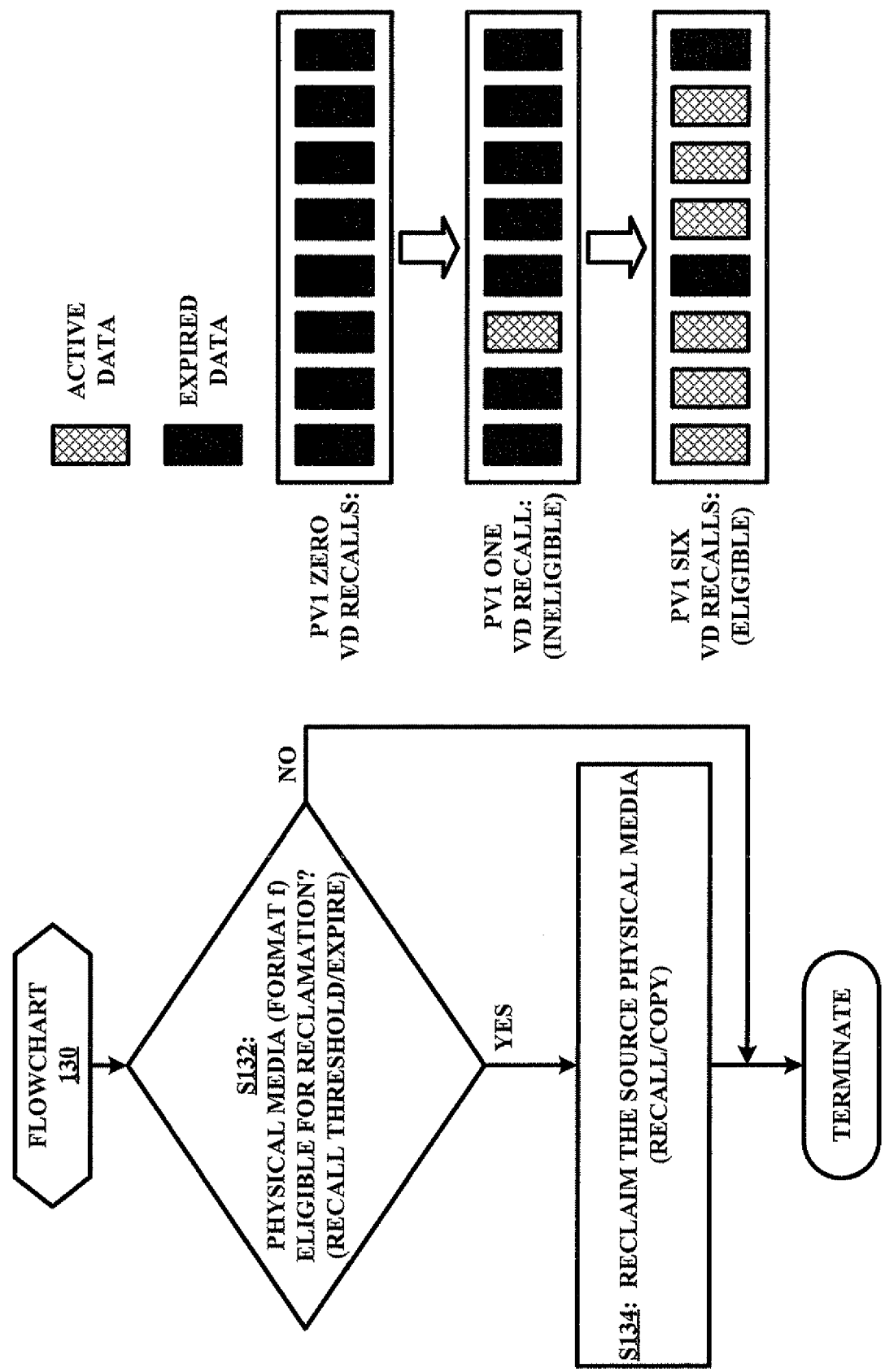

DYNAMIC MEDIA FORMAT CONVERSION OF PHYSICAL VOLUMES

FIELD OF THE INVENTION

The present invention generally relates to data storage and processing and, in particular to virtual storage systems. The present invention specifically relates to a method and system for efficiently transferring a database from one virtual storage system to another virtual storage system.

BACKGROUND OF THE INVENTION

FIG. 1 illustrates a known database management technique by media servers (e.g., a virtual tape server) involving the use of stubs in storing volume data residing in a virtual volume of a cache to a physical volume stored within a media library. Specifically, volume data within a virtual volume VV residing of a cache is premigrated to the media library prior to being fully migrated to the media library. Once fully migrated, the virtual volume VV is replaced within the cache by either a normal data-stub pairing or a short stub. One drawback to this technique is the existence of the physical volume PV within the media library without a corresponding stub in the cache whereby it had to be determined whether the physical volume has expired or was an undelete candidate. Conversely, another drawback to this technique is the existence of stub, normal or short, in the cache without a corresponding physical volume migrated within the media library whereby it had to be determined if the stub was an orphan.

To address these drawbacks, media servers are being designed for the management of migrating a virtual volume residing on a cache to a physical volume within the media library without the use of stubs. This stubless design avoids the time consuming and labor intensive transfer of a database between two stub based media servers. However, a transfer of a database from a stub based media server to a database of stubless media server requires additional techniques to make the transfer efficient because the databases are based on different database management systems (e.g., ADSM and DB2). Accordingly, what is needed in the art is an improved method for converting physical volumes in a virtual tape server from one media format (e.g., ADSM media format) to a second media format (e.g., a DB2 media format).

SUMMARY OF THE INVENTION

The present invention provides a new and unique dynamic media format conversion of physical volumes.

A first form of the present invention is a computer bearing medium tangibly embodying a program of machine-readable instructions executable by a processor to perform operations for a dynamic media format conversion of physical volumes stored within a media library. The operations comprise a recall of volume data in a media format f as stored in one or more source physical volumes of a source media, and an automatic premigration of the recalled volume data in a media format f to one or more target physical volumes of a target media, wherein the media format f is different in one or more aspects from the media format f.

A second form of the present invention is a virtual tape server comprising a processor; and a memory storing instructions operable with the processor for a dynamic media format conversion of physical volumes stored within a media library. The instructions are executed for recalling volume data in a media format f as stored in one or more source physical volumes of a source media, and for automatically premigrating the recalled volume data in a media format f to one or more target physical volumes of a target media, wherein the media format f is different in one or more aspects from the media format f.

A third form of the present invention is a method for a dynamic media format conversion of physical volumes stored within a media library. The method comprises a recall of volume data in a media format f as stored in one or more source physical volumes of a source media, and an automatic premigration of the recalled volume data in a media format f to one or more target physical volumes of a target media, wherein the media format f is different in one or more aspects from the media format f.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 3 illustrates flowcharts representative of one embodiment of a physical volume media format mapping method in accordance with the present invention;

FIG. 5 illustrates a flowchart representative of a recall media format conversion method in accordance with the present invention;

FIG. 6 illustrates an exemplary execution of the flowchart illustrated in FIG. 5;

FIG. 7 illustrates a flowchart representative of a reclaim media format conversion method in accordance with the present invention;

FIG. 8 illustrates an exemplary reclamation eligibility associated with the flowchart illustrated in FIG. 7;

DETAILED DESCRIPTION OF THE PRESENT INVENTION

Figure 1:
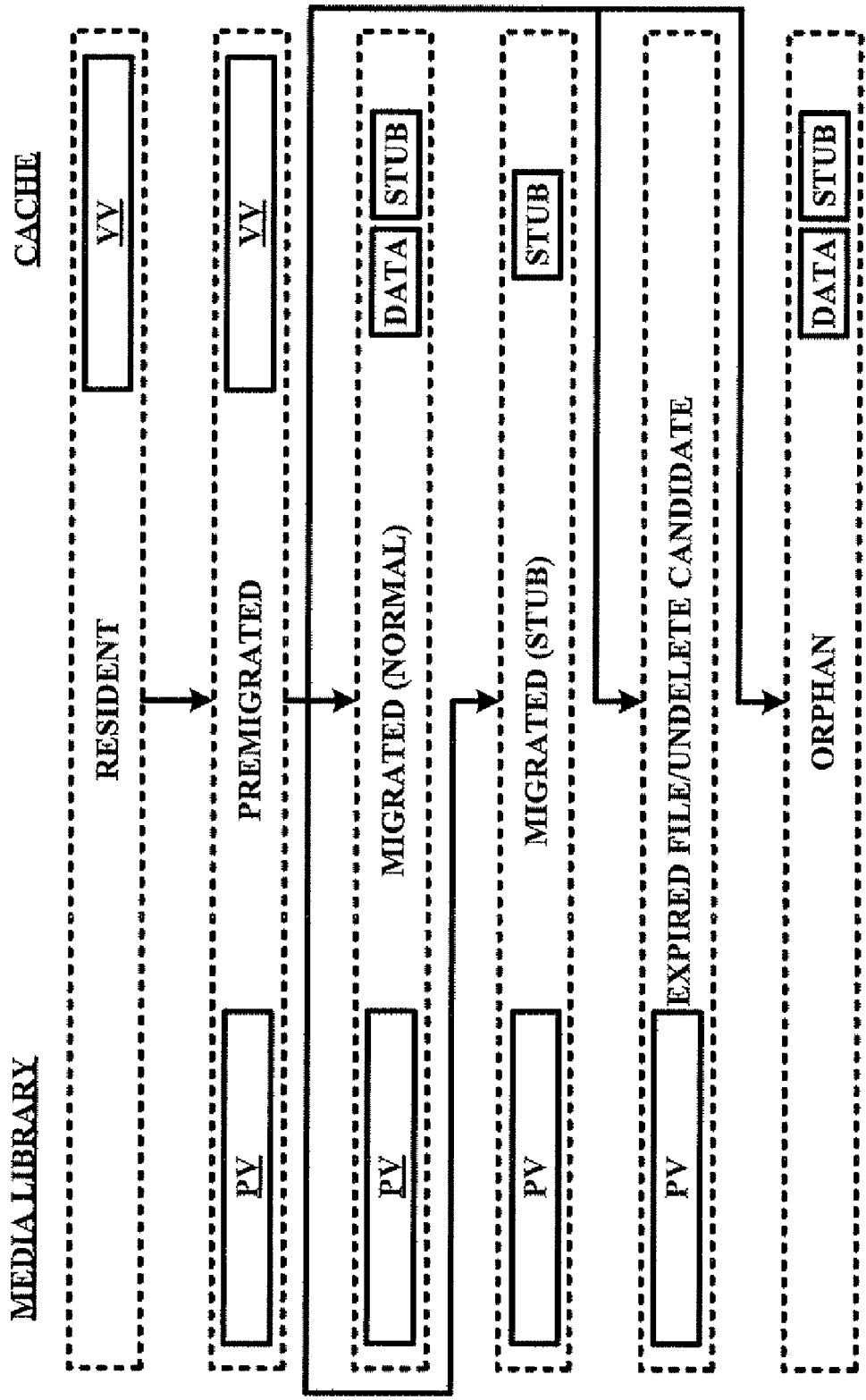
FIG. 1 illustrates a stub migration technique as known in the art.

FIG. 1 illustrates the storage states of a virtual volume in a virtual tape server that uses stubs. A volume (VV) that is written or modified in cache is considered resident in cache. When the volume is copied to physical tape (PV) and remains in cache, it is considered premigrated. When the copy in cache (VV) is removed, either a full stub (data and stub) or a short stub (stub only) remains in cache, the only copy is on physical tape (PV) and the volume is considered migrated.

Figure 2:
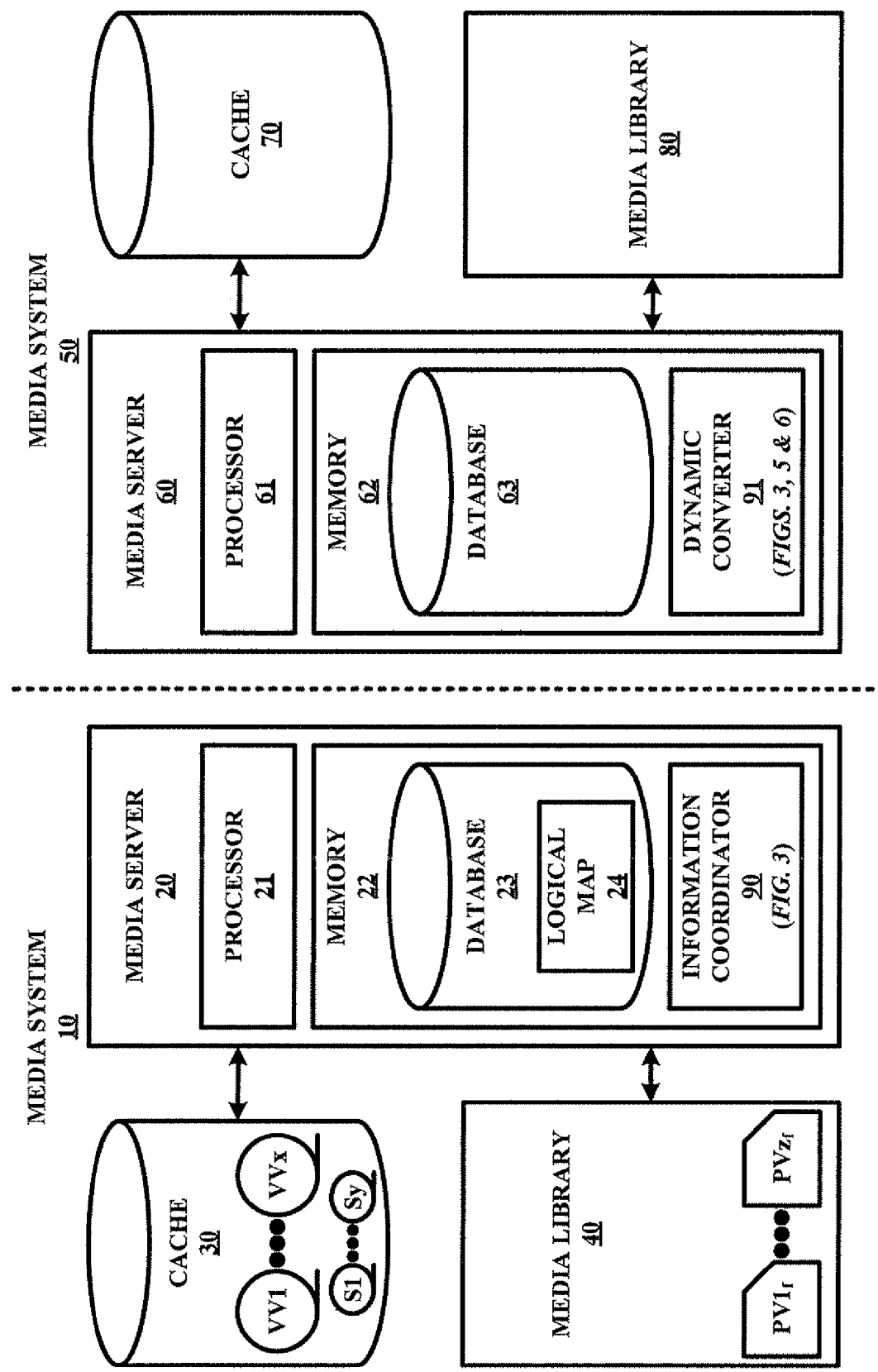
FIG. 2 illustrates one embodiment of a physical volume dynamic media format conversion device incorporated within a pair of media systems in accordance with the present invention.

FIG. 2 illustrates a media system 10 employing a media server 20 (e.g., a IBM 3494 B20 Virtual Tape Server) having a processor 21 and a memory 22 supporting a database 23. Media system 10 further employs a cache 30 and a media library 40 (e.g., an automated data library).

FIG. 2 further illustrates a illustrates a media system 50 employing a media server 60 (e.g., a IBM Virtualization Engine TS7700) having a processor 61 and a memory 62 supporting a database 63. Media system 60 further employs a cache 70 and a media library 80 (e.g., an automated data library).

Media server 20 has a stub based database management system (not show) (e.g., ADSM) whereby an x number of virtual volumes VV and a y number of stubs S reside within cache 30 to facilitate data transfer with a z number of physical volumes PV stored within media library 40 in accordance with a media format f (e.g., a ADSM based media format), wherein at any given moment $x \geq 0$, $y \geq 0$ and $z \geq 0$. By comparison, media server 60 has a stubless database management system (not shown)(e.g., DB2).

In view of replacing media server 20 with media server 60 for purposes of upgrading media system 10 to media system 50, the present invention is premised on dynamically converting physical volumes PV stored within media library 40 in accordance with media format f to physical volumes stored within media library 80 in accordance with a media format f (e.g., a DB2 based media format), which differs in one or more aspects than media format f. To this end, an information coordinator 90 of the present invention is installed within memory 22 of media server 20, and a dynamic converter 91 of the present invention is installed within memory 62 of media server 60. Specifically, information coordinator 90 and dynamic converter 91 are structurally configured with software and/or firmware to implement a physical volume media format conversion method of the present invention as represented by flowcharts 100 and 110 illustrated in FIG. 3.

Referring to FIG. 3, a stage S102 of flowchart 100 encompasses information coordinator 90 receiving a query for a mapping of logical volumes to physical volumes $PV_f$, and in response thereto, a stage S104 of flowchart 100 encompasses information coordinator 90 dumping a logical map 24 as shown in FIG. 2. Logical map 24 is transferred from media server 20 to media server 60 whereby a stage 112 of flowchart 110 encompasses dynamic converter 91 loading logical map 24 to thereby convert logical map 24 to a logical map 64 during a stage S114 of flowchart 110 with logical map 64 being suited for processing by the database management system of media server 60. To facilitate an execution by dynamic coordinator 91 of a recall media format conversion method and a reclamation media format conversion method of the present invention as will be subsequently described herein, a stage S116 of flowchart 100 encompasses dynamic coordinator 91 flagging each physical volume $PV_f$ for media format conversion of media format f to media format f.

Figure 4:
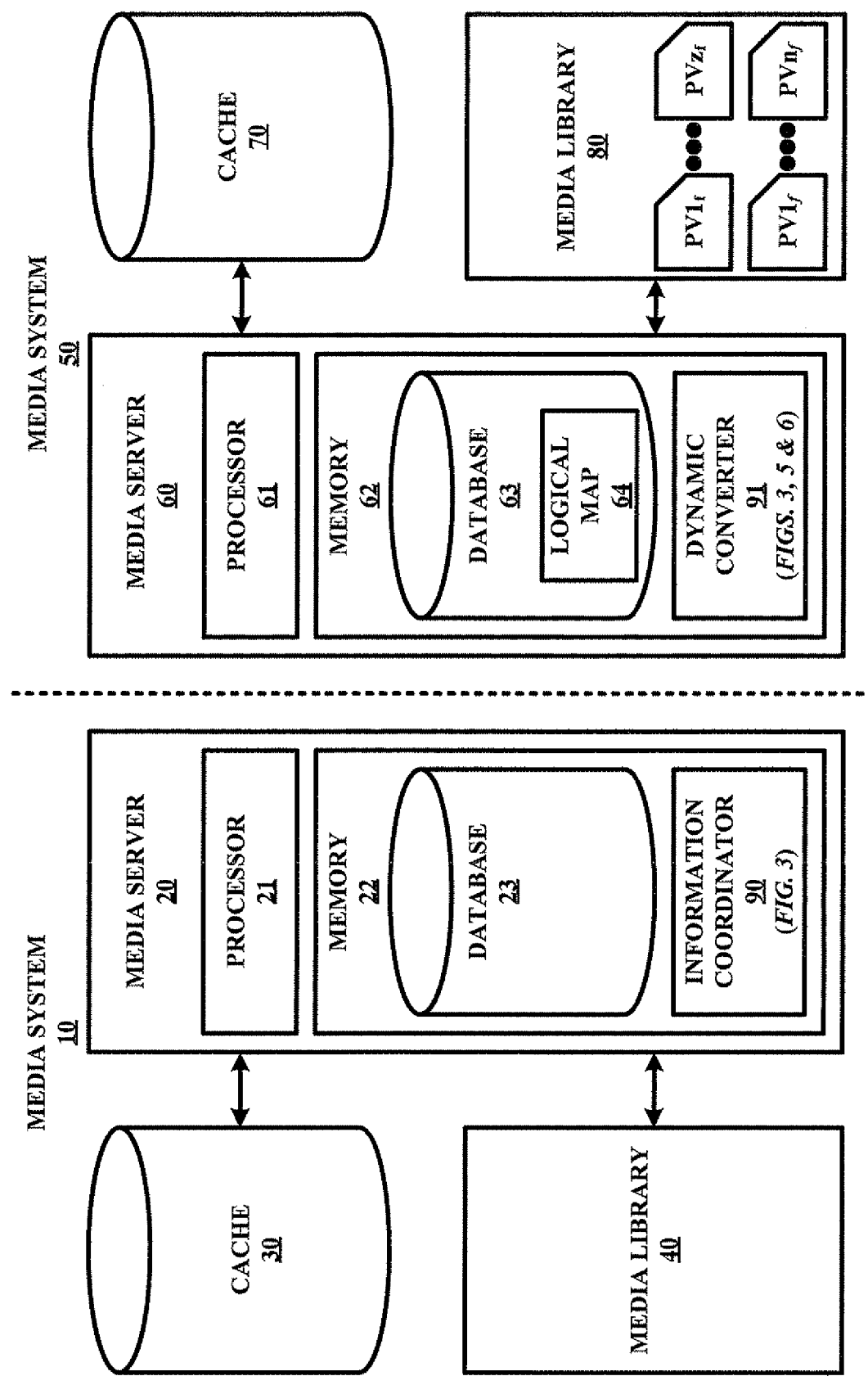
FIG. 4 illustrates operational states of a pair of media systems illustrated in FIG. 2 in accordance with an execution of the flowcharts illustrated in FIG. 3.

FIG. 4 illustrates operational states of media system 10 and media system 60 upon completion of flowcharts 100 and 110. In these operational states, physical volumes $PV_f$ have been physically reallocated from media library 40 to media library 80. Alternatively, media library 40 and media library 80 can be physically the same media library whereby media library 40 is physically removed from media system 10 and incorporated within media system 50 as media library 80. Additionally, a n number of new scratch physical media to be media formatted in media format f may be stored within media library 80 as shown. Alternatively, scratch physical media can be transferred from media library 40 to media library 80.

Logical map 64 resides in database 63 to enable dynamic coordinator 91 to execute the recall media format conversion method and the reclamation media format conversion method of the present invention.

FIG. 5 illustrates a flowchart 120 representative of the recall media format conversion method of the present invention, which is premised on media formatting volume data of a physical volume based on recalls of the volume data to cache. Specifically, a stage S122 of flowchart 120 encompasses dynamic coordinator 91 recalling volume data VD of a physical volume $PV_f$ as stored in media format f within media library 80 to a virtual volume VV1 residing in cache 70 as shown with the volume data becoming expired within media library 80. Thereafter, a S124 of flowchart 120 encompasses dynamic coordinator 91 premigrating volume data VD to a physical volume $PV_f$ as stored in media format f within media library 80 as shown in FIG. 6. Stage S122 is triggered in accordance with a recall media format conversion policy of media system 60, which may be based on a host job directed to recalling the volume data and/or a pre-rogrammed priority to media format convert physical volumes $PV_f$ that can be run during down-times of media system 60. Physical volume $PV_f$ may reside on a new scratch physical media or a reclaimed physical media.

By comparison, a normal recall sequence as known in the art is to recall volume data into cache on behalf of a host job. A migration of the volume data recalled to cache occurs some period of time after the host job has completed (i.e., the recalled volume data is removed from cache without any transfer of the volume data from cache back to physical tape).

FIG. 7 illustrates a flowchart 130 representative of a reclamation media format conversion method of the present invention, which is premised on reclaiming a physical media to a target media in media format f where the source physical media is a physical volume $PV_f$ in media format f. Specifically, a stage S132 of flowchart 130 encompasses dynamic converter 91 determining whether a source physical media is eligible for reclamation. In a first embodiment, a source physical media is deemed eligible for reclamation upon entirely consisting of expired volume data based on recalls/premigrations of all of the volume data. In a second embodiment, a source physical media is deemed eligible for reclamation upon exceeding a reclamation threshold number of volume data recalls of the residing physical volume $PV_f$, such as, for example, six (6) volumes recalls of eight (8) volumes as shown in FIG. 8. In a third embodiment, a source physical media is deemed eligible for reclamation upon any unconverted volume data being declared as being expired, such as, for example, the source physical media is no longer needed or invalid or the logical volume(s) from a physical volume were replaced with a newer version of the same logical volume(s).

Figure 9:
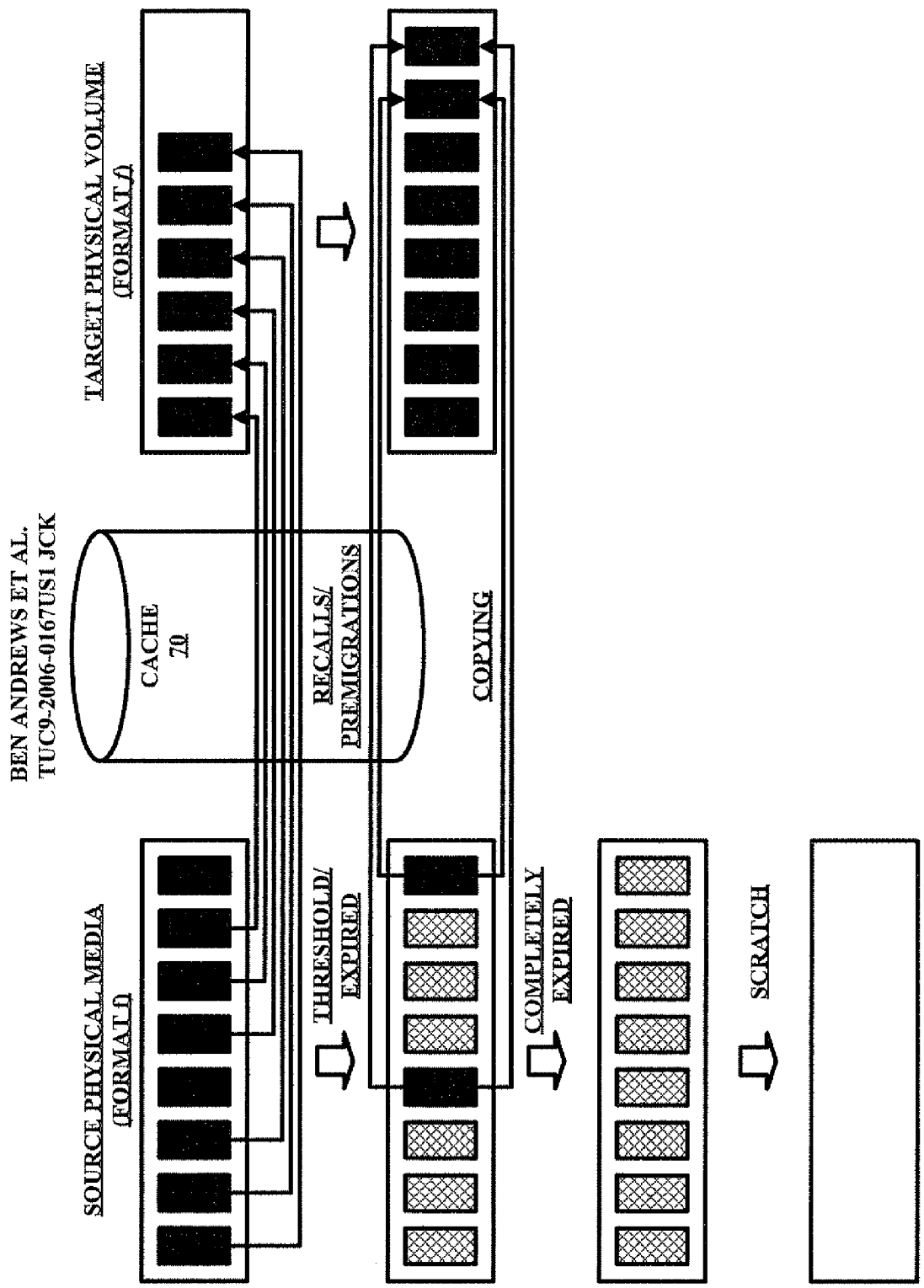
FIG. 9 illustrates an exemplary execution of the flowchart illustrated in FIG. 7.

A stage S134 of flowchart 130 encompasses dynamic coordinator 91 reclaiming the source physical media. In a first embodiment, recalls/premigrations of all the volume data deems the source physical media as being completely expired whereby the source physical media maybe reclaimed without any further format conversions. In a second embodiment, as shown in FIG. 9, six (6) volume data recalls/premigrations of eight (8) volumes from a source physical media to a target physical media exceeds a reclamation threshold whereby a format conversion of the two (2) remaining volumes from the source physical media to the target physical media is accomplished by volume data recalls/automatic premigrations of the two (2) remaining volumes from the source physical media to the target physical media. In a third embodiment, as shown in FIG. 9, the last (2) remaining volumes of the source physical media are deemed as being expired subsequent to the previous recalls/automatic premigrations of the six (6) volumes of the source physical media whereby a format conversion of the two (2) remaining volumes from the source physical media to the target physical media is accomplished by a copying of the two (2) remaining volumes from the source physical media to the target physical media. For both embodiments, the source physical media will eventually be completed expired whereby the source physical media can be allocated to a common scratch pool.

Figure 10:
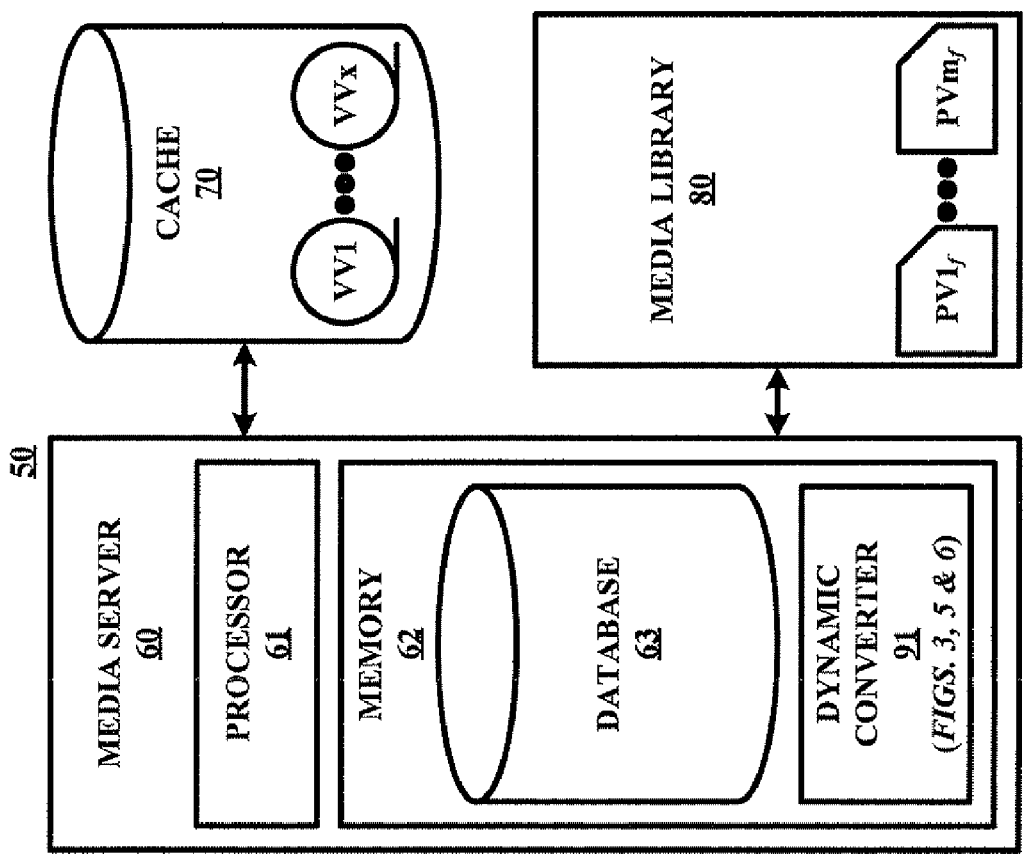
FIG. 10 illustrates an operational state of a media system illustrated in FIG. 4 in accordance with an execution of the flowcharts illustrated in FIGS. 5 and 7.

Flowchart 130 is repeatedly executed as needed based on a priority basis to ensure a timely yet efficient and unburdensome media format conversion of all physical volumes. FIG. 10 illustrates an operational state of media system 60 upon a total media format conversion of physical volumes PVf.

In practice, the present invention does not impose any limitations or any restrictions to the structural configuration of a media server 60 as shown in FIG. 2 or any deviation thereof. To facilitate a further understanding of the present invention, an exemplary embodiment of virtual tape server 140 for implementing the present invention will now be provided herein.

Figure 11:
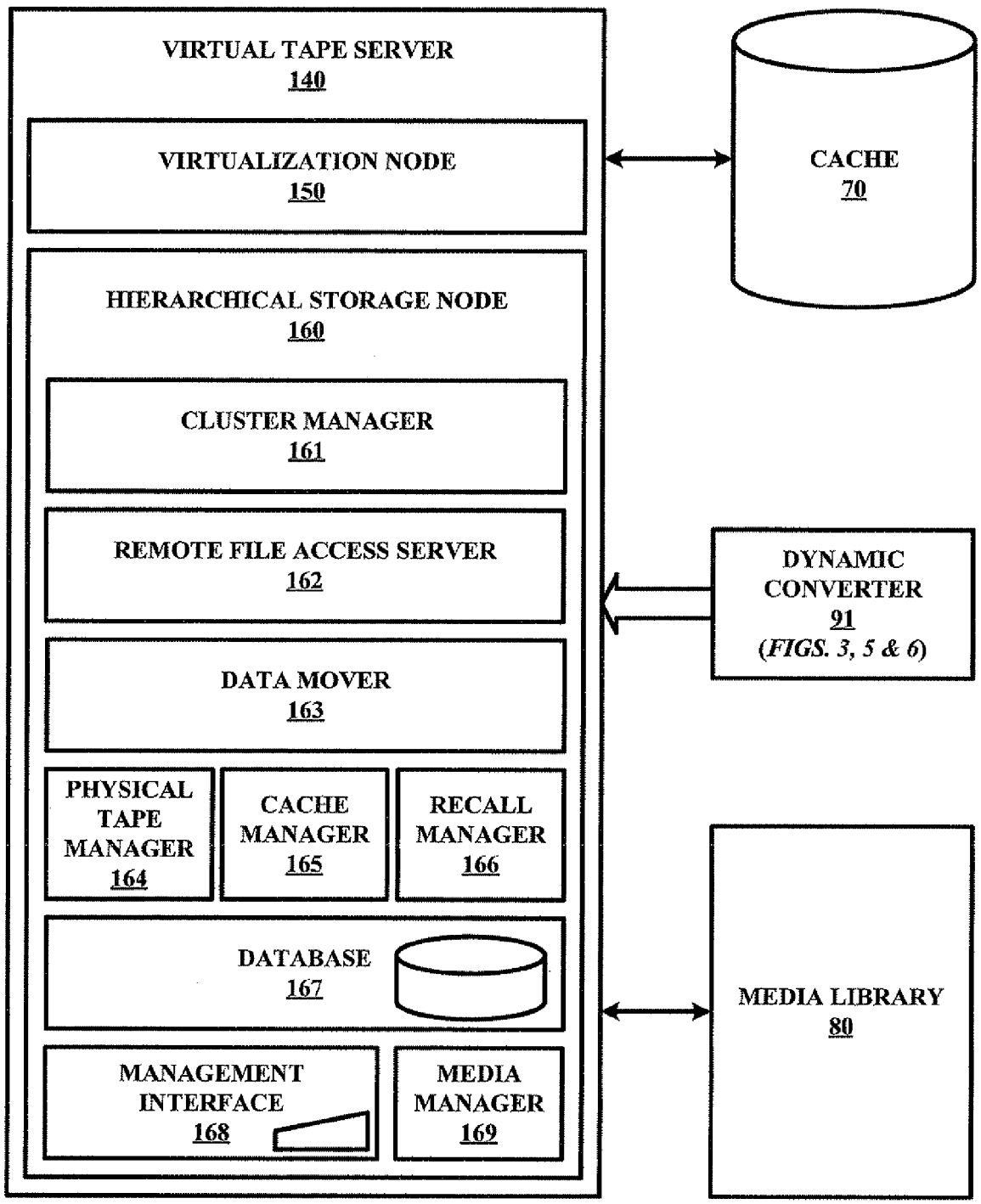
FIG. 11 illustrates an exemplary embodiment of a virtual tape system in accordance with the present invention.

Referring to FIG. 11, an exemplary virtual tape server 140 employs virtualization node 150 and a hierarchical storage node 160 having a cluster manager 161, a remote file access server 162, a data mover 163, a physical tape manager 164, a cache manager 165, a recall manager 166, a database 167, a management interface 168 and a media manager 169.

Virtualization node 150 includes tape daemons (not shown) emulating a tape drive (e.g., IBM 3490 tape drive) to a host (not shown). In one embodiment, virtualization node 150 operates on a file that is either on cache 70 or operates on a remote cluster's cache (not shown) through remote file access server 162. Cluster manager 161 coordinates operations between clusters via tokes that are stored in each cluster's database 167 to determine which cluster has a current copy of data and coordinates coping of data between clusters.

Remote file access server 162 provides a link to cache 20 by an remote cluster. Data mover 163 controls the actual data transfer operations for copies performed between clusters and transfers of data between cache 70 and library 80. Physical tape manager 164 manages physical tapes in library 30 in multiple pools (not shown). controls reclamation, borrow/return of volumes from a scratch pool, and movement of tapes between pools. Cache manager 165 controls a copying of data between cache 70 to library 80 and any subsequent removal of a redundant copy of data in cache 70, and provides control signals to balance data flow between cache 70 and other node 160 components. Recall manager queues and controls recalls of data into cache 20 from library 30 on behalf of virtualization node 150 or cluster manager 161.

Management interface 168 provide information about server 140 and allows a user control and configuration of server 140. Media manager 169 manages the handling of physical tapes and error recovery, and diagnoses errors and determines if the errors were caused by a physical tape drive or a physical tape media to thereby take appropriate action.

For implementing the present invention, dynamic coordinator 91 is primarily integrated within data mover 163 with support from managers 164-166.

Those having ordinary skill in the art will appreciate numerous advantages of the present invention including, but not limited to, an efficient media format conversion of physical volumes within a media server, particularly a virtual tape server.

The term "processor" as used herein is broadly defined as one or more processing units of any type for performing all arithmetic and logical operations and for decoding and executing all instructions related to facilitating an implementation by a media server of the various physical volume media format conversion methods of the present invention. Additionally, the term "memory" as used herein is broadly defined as encompassing all storage space in the form of computer readable mediums of any type within the media server.

Those having ordinary skill in the art of physical volume media format conversion techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A computer bearing medium tangibly embodying a program of machine-readable instructions executable by a processor to perform operations for a dynamic media format conversion of physical volumes stored within a media library, the operations comprising:

recalling, to a cache, volume data in a media format f as stored in at least one source physical volume of a source media stored in the media library, wherein the recalling to the cache is triggered in accordance with a recall media format conversion policy, wherein based on the recall media format conversion policy the recalling is performed during a down-time of a media system that has the cache and the media library, wherein the media system has a stubless database management, wherein the dynamic media format conversion causes a conversion of a physical volume stored within another media system that has a stub based database management system, wherein in presence of the stub based database management system selected volume data is stored in stubs, and wherein in presence of the stubless database management system the selected volume data is not stored in stubs;

automatically premigrating, from the cache, the recalled volume data in a media format f to at least one target physical volume of a target media stored in the media library, wherein the media format f is different in at least one aspect from the media format f;

expiring the recalled volume data as stored in the at least one source physical volume of the source media.

2. The computer bearing medium of claim 1, the operations further comprising:

reclaiming the source media based on the expired recalled volume.

3. The computer bearing medium of claim 1, the operations further comprising:

reclaiming the source media based on the expired recalled volume data exceeding a reclamation threshold.

4. The computer bearing medium of claim 1, the operations further comprising:

expiring any additional volume data stored in the at least one source physical volume of the source media.

5. The computer bearing medium of claim 4, the operations further comprising:

reclaiming the source media based on an expiration of the additional volume data.

6. The computer bearing medium of claim 5, the operations further comprising:

loading a logical map of the at least one source physical volume; and flagging each source physical volume for a conversion from the media format f to the media format f.

7. A media server, wherein the media server is coupled to a cache and a media library, the media server comprising:
a processor; and
a memory storing instructions operable with the processor for a dynamic media format conversion of physical volumes stored within the media library, the instructions executed for:
recalling, to the cache, volume data in a media format f as stored in at least one source physical volume of a source media stored in the media library, wherein the recalling to the cache is triggered in accordance with a recall media format conversion policy, wherein based on the recall media format conversion policy the recalling is performed during a down-time of a media system that has the media server, the cache and the media library, wherein the media system has a stubless database management, wherein the dynamic media format conversion causes a conversion of a physical volume stored within another media system that has a stub based database management system, wherein in presence of the stub based database management system selected volume data is stored in stubs, and wherein in presence of the stubless database management system the selected volume data is not stored in stubs;
automatically premigrating, from the cache, the recalled volume data in a media format f to at least one target physical volume of a target media stored in the media library, wherein the media format f is different in at least one aspect from the media format f; and
expiring the recalled volume data as stored in the at least one source physical volume of the source media.

8. The media server of claim 7, wherein the instructions are further executed for:
reclaiming the source media based on the expired recalled volume.

9. The media server of claim 7, wherein the instructions are further executed for:
reclaiming the source media based on the expired recalled volume data exceeding a reclamation threshold.

10. The media server of claim 7, wherein the instructions are further executed for:
expiring any additional volume data stored in the at least one source physical volume of the source media.

11. The media server of claim 10, wherein the instructions are further executed for:
reclaiming the source media based on an expiration of the additional volume data.

12. The media server of claim 7, wherein the instructions are further executed for:
loading a logical map of the at least one source physical volume; and
flagging each source physical volume for a conversion from the media format f to the media format f.

13. A method for a dynamic media format conversion of physical volumes stored within a media library, comprising:
recalling, to a cache, volume data in a media format f as stored in at least one source physical volume of a source media stored in the media library, wherein the recalling to the cache is triggered in accordance with a recall media format conversion policy, wherein based on the recall media format conversion policy the recalling is performed during a down-time of a media system that has the cache and the media library, wherein the media system has a stubless database management, wherein the dynamic media format conversion causes a conversion of a physical volume stored within another media system that has a stub based database management system, wherein in presence of the stub based database management system selected volume data is stored in stubs, and wherein in presence of the stubless database management system the selected volume data is not stored in stubs;
automatically premigrating, from the cache, the recalled volume data in a media format f to at least one target physical volume of a target media stored in the media library, wherein the media format f is different in at least one aspect from the media format f; and
expiring the recalled volume data as stored in the at least one source physical volume of the source media.

14. The method of claim 13, further comprising
reclaiming the source media based on the expired recalled volume.

15. The method of claim 13, further comprising:
reclaiming the source media based on the expired recalled volume data exceeding a reclamation threshold.

16. The method of claim 13, further comprising:
expiring any additional volume data stored in the at least one source physical volume of the source media.

17. The method of claim 16, further comprising:
reclaiming the source media based on an expiration of the additional volume data.

18. The method of claim 13, further comprising:
loading a logical map of the at least one source physical volume; and
flagging each source physical volume for a conversion from the media format f to the media format f.

* * * * *